United States Patent

[11] 3,537,583

[72] Inventors Gerhard Wahner
Plochingen;
Jurgen Zink, Kemnat, Germany
[21] Appl. No. 724,396
[22] Filed April 26, 1968
[45] Patented Nov. 3, 1970
[73] Assignee Menzel & Co.
Stuttgart-Wangen, Germany
[32] Priority April 29, 1967
[33] Germany
[31] No. M73790

[54] APPARATUS FOR PURIFYING WASTE WATERS
12 Claims, 5 Drawing Figs.
[52] U.S. Cl. .................................................. 210/195,
210/4, 210/8, 210/532
[51] Int. Cl. .................................................. C02c 1/08
[50] Field of Search .......................................... 210/3—8,
14, 15, 194—197, 220, 221, 252, 259

[56] References Cited
UNITED STATES PATENTS
2,616,565 11/1952 Morgan ........................ 210/195
3,173,866 3/1965 Lefton et al. ................. 210/14-X
3,220,945 11/1965 Torpey ........................ 210/197-X
3,118,835 1/1964 Butler et al. .................. 210/221

Primary Examiner—Michael E. Rogers
Attorney—Walter Becker

ABSTRACT: An apparatus and method for purifying waste waters, according to which waste is aerated at an aerating tank, whereupon the sludge is separated from the waste water in a postsettling tank and is subsequently concentrated or thickened in a sludge thickening tank while the sludge level in the postsettling is kept substantially constant by continuously controlling the transfer of sludge from the postsettling tank to at least one of the other two tanks, and while water is conveyed from said sludge thickening tank to at least one of the other two tanks.

Inventors:
Gerhard Wähner
Jürgen Zink

APPARATUS FOR PURIFYING WASTE WATERS

The present invention relates to an apparatus for purifying waste waters with an aerating vessel or tank connected through at least one conduit with an aerating device, for instance an aerating blower, and with a postpurifying vessel connected to said aerating tank, said postpurifying vessel comprising a running-off trough and being connected to a vessel or tank for thickening or concentrating the sediments or sludge.

With heretofore known devices of the above-mentioned type it is disadvantageous that relatively large quantities of water collect in the thickening or concentrating tank which quantities have to be withdrawn again and again, for instance by pumps, in order to obtain a thickening of the sediments or sludge.

It is an object of the present invention to provide an apparatus of the above-mentioned general type which will assure a uniform and thorough purification of waste waters and in which in particular an automatic return of the water from the thickening tank, preferably into the aerating tank, will be made possible.

It is another object of this invention to provide an apparatus as set forth in the preceding paragraph, in which ascending sediments or sludge will be retained in the postpurifying tank prior to the discharge of the water.

These and other objects and advantages of the invention will appear more clearly from the following specification in connection with the accompanying drawings, in which:

FIG. 1 diagrammatically illustrates a vertical section through an apparatus according to the present invention;

Figure 1:
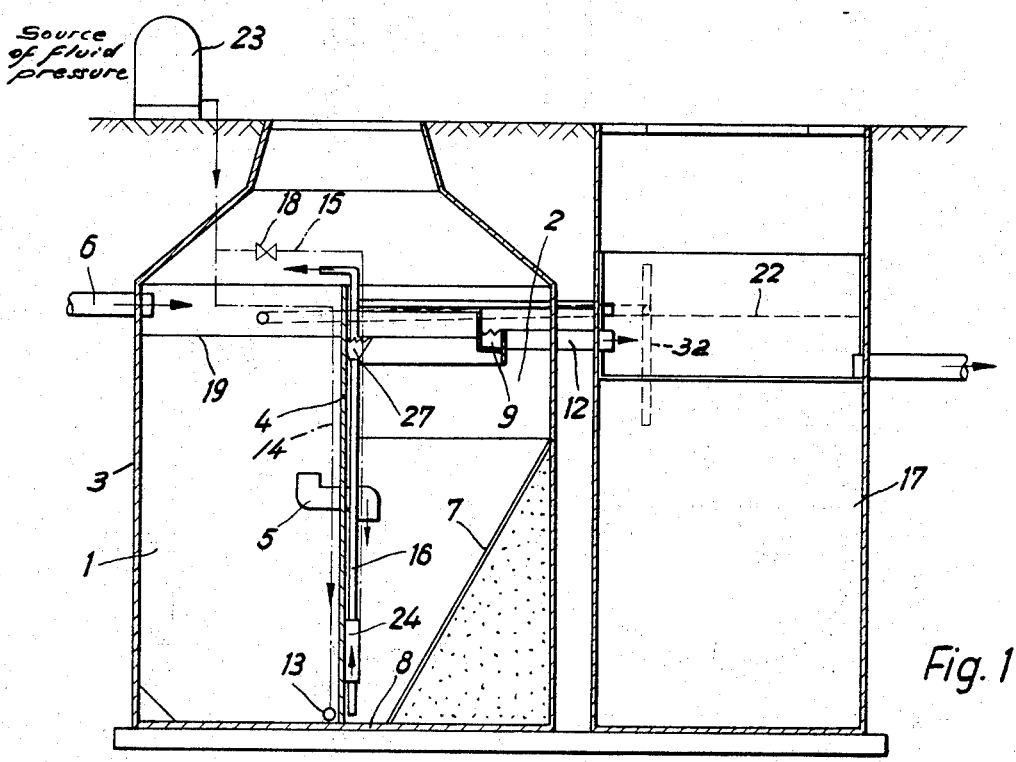

A device for purifying waste waters with an aerating tank connected through at least one conduit with an aerating device, for instance a blower, and with a postpurifying tank connected with said aerating tank while equipped with a discharge passage and with a sediment- or sludge-thickening tank is, according to the present invention, characterized in that at least one return conduit leading to the aerating tank is connected to the thickening tank, which return conduit at a free fall leads into the aerating tank above the predetermined liquid level, and is furthermore characterized in that the discharge passage is closed completely at one side while having its other side provided with openings for admitting water.

The return conduit makes possible an automatic thickening of the sediments or sludge because the water which ascends in the thickening tank continuously runs off by itself while the closed side of the discharge passage will assure that floating sediments or the like ascending in the postpurifying tank will be retained within the space confined by the discharge passage and thereby will be prevented from passing into the running-off trough. This is particularly the case when the postpurifying tank has the shape of a funnel and the space defined by the running-off trough is located above the funnel bottom, preferably on that side which faces the aerating tank. With such a design, the floating sediments or sludge ascends into the space defined by the running-off trough so that said sediments cannot pass into the discharge located above the funnel bottom.

According to a further feature of the invention, the lower range of the postpurifying tank is equipped with at least one compressed air lifter which preferably communicates through a conduit with the aerating device while at least one sludge conduit leads from the lower portion of the postpurifying tank to the aerating tank and/or sludge-thickening tank. In this way, with a simple design of the device there will be assured that the sludge level in the postpurifying tank can always be held constant.

It is particularly advantageous to arrange a valve in the air conduit of at least one compressed air lifter and/or at least one sludge conduit, preferably in the sludge conduit leading to the sludge-thickening tank. Such valve may be a magnetic valve inasmuch as in such instance a precisely controlled transfer of the sludge from the postpurifying tank to the aerating tank or the sludge-thickening tank will be made possible.

According to a further development of the invention, a funnel or hopper is provided in the space defined by the running-off trough, said funnel or hopper being by means of a conduit connected to the aerating tank, preferably to a compressed air lifter so that the floating sludge which forms within the space defined by the running-off trough at the surface of the postpurifying tank can be withdrawn. The funnel or hopper may be arranged in a simple manner between the sludge conduits.

In order even better to be able to retain the floating sludge ascending in the postpurifying tank and to prevent said sludge from entering the running-off trough, according to a further feature of the invention, there is provided a partition which protrudes beyond the bottom side of the running-off trough, preferably within the outer range thereof.

A method for purifying waste waters according to which from the waste water after the aerating operation settled sludge is separated in a postpurifying or settling tank and is thickened in a further tank, is characterized according to the present invention in that the sludge level is held approximately constant by continuously controlling the transfer of the sludge into the aerating and/or the thickening tank, the water being returned from the thickening tank to the aerating tank and/or the postsettling tank. This transfer of the sludge into the sludge-thickening tank can be effected without high costs when said sludge by means of aerating air is pressed into the aerating tank and/or the thickening tank because in this way a separate compressed air source is not required.

Figure 2:
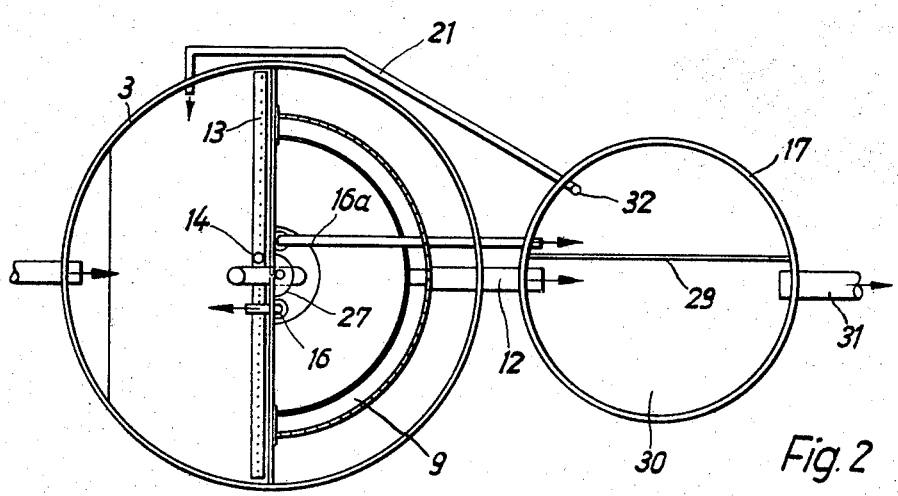
FIG. 2 is a top view of the apparatus according to FIG. 1.

Referring now to the drawings in detail and FIGS. 1 and 2 thereof in particular, these FIGS. show a device according to the present invention which comprises an aerating tank 1 and a postsettling tank 2 which is arranged directly adjacent to said aerating tank 1. The aerating and postsettling tanks are formed by a single cylindrical vessel 3 which is subdivided by means of a partition 4 located in an axial plane.

The aerating tank 1 and the postsettling tank 2 are interconnected by means of a Z-shaped elbow conduit 5 which is located approximately at half the height of the tanks 1, 2. The elbow conduit 5 is with its upwardly directed end located in the aerating tank 1 and with its downwardly directed portion in the postsettling tank 2. Connected to the aerating tank 1 is a feeding conduit 6 for the waste water.

The postsettling tank 2 has a truncated, cone-shaped, sectionlike, inclined bottom 7 the lowest part 8 of which is located on that side of the postsettling tank 2 which faces the partition 4 and, more specifically, is arranged within the area of the central plane of said tank 2.

In the upper range of the postsettling tank 2 there is provided a semicircular running-off trough 9 which has its ends connected to the partition 4. The trough 9 has that side thereof which faces the partition 4 closed by a wall 10 (FIGS. 3 and 4) which is approximately located in a vertical plane. That side 11 of said trough 9 which faces away from wall 10 is serrated so that the cleared or treated waste water in the postsettling tank can from this side flow into the trough 9. The trough 9 has connected thereto a discharge conduit 12 which is located symmetrically with regard to the postsettling tank 2 and leads away from the latter at that side which faces away from the partition 4.

Figure 5:
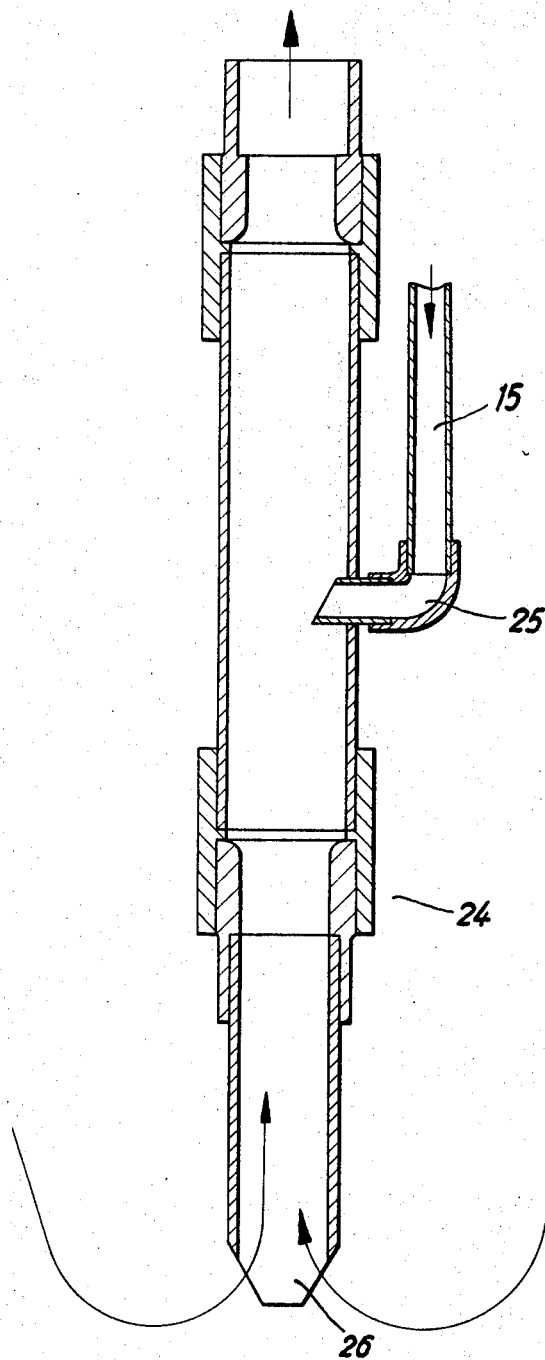
FIG. 5 is a section through a compressed air lifter.

At the bottom of the aerating tank 11 and parallel to the partition 4 and in the direct vicinity of said partition 4 there is provided an aerating pipe 13 which in the vicinity of its longitudinal central area is connected to a vertical feeding line 14 which communicates with a pressure source 23. A branch line 15 branching off from the feeding line 14 leads to two compressed air lifters 24 arranged in separate sludge conduits 16, 16a. Such lifters 24 may be designed in conformity with the showing of FIG. 5. One sludge conduit 16 which is located on one side of the elbow conduit 5 leads to the lowest portion 8 of the postsettling tank 2 and above the partition 4 is directed toward the aerating tank 1. The other sludge conduit 16a extends parallel to the first mentioned conduit 16 to the lowest portion 8 of the postsettling tank 2 and in the vicinity of the upper edge of the partition 4 above the trough 9 leads to a partially cylindrical sludge-thickening tank 17 which is located adjacent the postsettling tank 2. Expediently, two separate branch conduits 15 are provided for each compressed air lifter 24, each of said branch conduits 15 having interposed therein a magnetic valve 18. When the valve 18 is opened, compressed air passes through the elbow conduit 25 (FIG. 5) into the lifter 24 so that by means of its lower opening 26, sludge in the postsettling tank 2 will be drawn in and pressed upwardly. Depending on the respective requirements, the sludge can be pressed into the aerating tank 1 or the sludge-thickening tank 17.

As will be evident from FIGS. 1 and 2, the sludge-thickening tank 17 is connected to the aerating tank 1 through the intervention of a return conduit 21. The return conduit 21 leads into the sludge-thickening tank 17 above the predetermined water level 22. Similarly, the return conduit 21 also leads into the aerating tank 1 above the predetermined water level 19. When conveying settling sludge from the postsettling tank 2 into the sludge-thickening tank 17 which has about the same level, the water level in the latter will rise so that the water passes through the return conduit 21 back into the aerating tank 1.

In order to return the rising floating sludge which collects within the inner zone of the running-off trough 9 to the aerating tank 1, a funnel 27 is provided in this area. This funnel 27 is brought into communication with a compressed air lifter which latter presses the sludge or the sediments from the annular chamber within the trough 9 into the aerating tank 1. As compressed air lifter there may be provided one of the already available compressed air lifters or an additional compressed air lifter. The funnel 27 is located between the sludge conduits 16, 16a. The upper edge of said funnel 27 is serrated. The floating sludge within the space defined by the trough 9 may, however, also be directly conveyed to the sludge-thickening tank 17.

Figure 4:
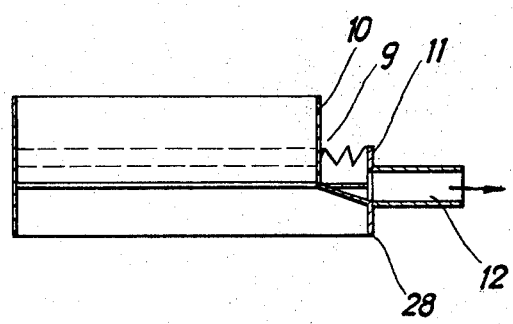
FIG. 4 is a section taken along the line IV-IV of FIG. 3.
Figure 3:
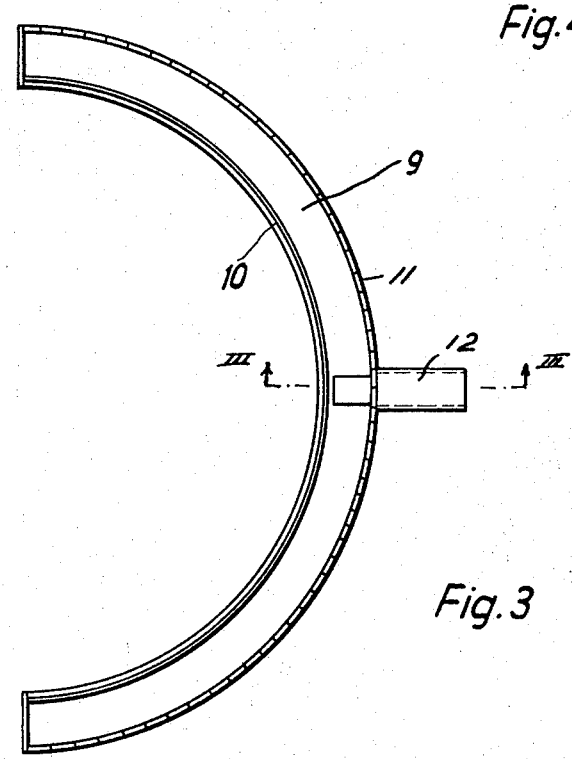
FIG. 3 shows a top view of the discharge passage or trough on a somewhat larger scale than that of FIGS. 1 and 2.

As will be seen from FIGS. 3 and 4, the trough 9 has its outer side provided with a downwardly protruding wall 28 by means of which floating sludge will be prevented from passing from the space defined by trough 9 toward the outside. The front immersing wall 28 preferably consists of one piece with the front side 11 of the trough 9. The immersing wall 28 as well as the front side 11 of the trough 9 may be provided with cutouts, as for instance oblong passages located one above the other.

Within the range of the connecting area of the discharge 12 on the trough 9, the bottom of the trough is inclined downwardly and offset so that a favorable discharge of the purified water will be obtained.

As will be seen from FIGS. 1 and 2, the sludge-thickening tank 17 is subdivided by a partition 29. The discharge conduit 12 leads into that chamber 30 of tank 17 to which a discharge conduit 31 is connected.

According to arrangement illustrated in FIGS. 1 and 2, the return conduit in the sludge-thickening tank 17 is provided with a vertical pipe section 32 which extends downwardly below the water level 22 and upwardly above said water level so that the floating sludge is prevented from passing into the conduit 21.

It is, of course, to be understood that the present invention is, by no means, limited to the particular arrangement shown in the drawings but also comprises any modifications within the scope of the disclosure.

We claim:

1. An apparatus for purifying waste waters, which includes: an aerating tank; first conduit means extending into said aerating tank and adapted to be connected to an aerating device; a postsettling tank in communication with said aerating tank, said postsettling tank having arranged therein channel means with a first closed side and a second open side opposite said first side for admitting liquid collected in said postsettling tank into said channel means; a sludge-thickening tank, second conduit means leading from said channel means into said sludge-thickening tank; and third conduit means forming return conduit means for returning liquid exceeding a desired liquid level in said sludge-thickening tank to said aerating tank and letting said liquid drop in a free fall into said aerating tank, said postsettling tank having an inclined bottom arranged below said channel means and having its lower end closer to said aerating tank than its upper end.

2. An apparatus according to claim 1, in which said first side of said channel means is closer to said aerating tank then said open side.

3. An apparatus according to claim 1, in which said return conduit means extends into said sludge-thickening tank below the desired liquid level for said sludge-thickening tank.

4. An apparatus according to claim 1, in which includes compressed air lifter means arranged in the lower portion of said postsettling tank and adapted to be connected with a source of compressed air, and fourth conduit means leading from the lower portion of said postsettling tank to one of the other tanks for conveying sludge thereto.

5. An apparatus according to claim 4, which includes valve means respectively interposed in said air lifter means and said fourth conduit means.

6. An apparatus according to claim 4, which includes funnel means arranged in the space defined by said channel means and said aerating tank and communicating with said aerating tank.

7. An apparatus according to claim 6, which includes compressed air lifter means communicating with said funnel means.

8. An apparatus according to claim 6, in which said fourth conduit means comprises two spaced conduits, and in which said funnel means is arranged between said two spaced conduits.

9. An apparatus according to claim 1, in which said aerating tank and said postsettling tank are formed by a common vessel divided by a partition, and in which the ends of said channel means are connected to and supported by said partition.

10. An apparatus according to claim 4, in which said fourth conduit means extend approximately to the lowermost portion of said postsettling tank.

11. An apparatus according to claim 1, which includes Z-shaped conduit means arranged partially within said aerating tank and partially within said postsettling tank and establishing communication therebetween.

12. An apparatus for purifying waste waters, which includes: an aerating tank; first conduit means extending into said aerating tank and adapted to be connected to an aerating device; a postsettling tank in communication with said aerating tank, said postsettling tank having arranged therein channel means with a first closed side and a second open side opposite said first side for admitting liquid collected in said postsettling tank into said channel means; a sludge-thickening tank, second conduit means leading from said channel means into said sludge-thickening tank; and third conduit means forming return conduit means for returning liquid exceeding a desired liquid level in said sludge-thickening tank to said aerating tank and letting said liquid drop in a free fall into said aerating tank, said channel means in said postsettling tank having connected thereto wall means protruding downwardly from the bottom level of said channel means and protruding in the direction toward said sludge-thickening tank.